United States Patent
Rousu et al.

(10) Patent No.: US 6,923,888 B2
(45) Date of Patent: Aug. 2, 2005

(54) PROCESS FOR RECOVERING ORGANIC ACIDS FROM BLEACHING LIQUORS

(75) Inventors: Pasi Rousu, Oulu (FI); Päivi Rousu, Oulu (FI); Esa Rousu, Oulu (FI); Juha Anttila, Oulu (FI)

(73) Assignee: Chempolis Oy, Oulu (FI)

( * ) Notice: Subject to any disclaimer, the term of this patent is extended or adjusted under 35 U.S.C. 154(b) by 440 days.

(21) Appl. No.: 10/220,482

(22) PCT Filed: Feb. 27, 2001

(86) PCT No.: PCT/FI01/00197

§ 371 (c)(1),
(2), (4) Date: Nov. 15, 2002

(87) PCT Pub. No.: WO01/65003

PCT Pub. Date: Sep. 7, 2001

(65) Prior Publication Data

US 2003/0145961 A1 Aug. 7, 2003

(30) Foreign Application Priority Data

Feb. 28, 2000 (FI) .............................. 20000453

(51) Int. Cl.⁷ ........................... D21C 11/00; D21C 3/04; D21C 9/10; B01D 1/00
(52) U.S. Cl. ............................ 162/16; 162/32; 162/76; 162/80; 162/81; 162/82; 162/90; 162/99; 159/47.3; 210/710; 210/924; 210/928
(58) Field of Search .............................. 162/14, 16, 29, 162/32, 37–40, 60, 64–67, 70, 72, 76, 78, 80–82, 90, 94–99; 8/156; 159/47.3; 210/710, 724, 928

(56) References Cited

U.S. PATENT DOCUMENTS

| | | | | | |
|---|---|---|---|---|---|
| 3,576,709 | A | * | 4/1971 | Menzies | 162/16 |
| 4,087,318 | A | * | 5/1978 | Samuelson et al. | 162/60 |
| 4,222,819 | A | * | 9/1980 | Fossum et al. | 162/76 |
| 5,306,392 | A | | 4/1994 | Mita | |
| 6,156,156 | A | | 12/2000 | Rousu et al. | |
| 6,183,597 | B1 | | 2/2001 | Siegle | |
| 6,503,369 | B2 | * | 1/2003 | Rousu et al. | 162/29 |
| 6,776,876 | B1 | * | 8/2004 | Vuorinen et al. | 162/65 |
| 6,830,696 | B1 | * | 12/2004 | El-Shall et al. | 210/716 |

FOREIGN PATENT DOCUMENTS

| | | |
|---|---|---|
| WO | WO 99/10595 | 3/1999 |
| WO | PCT/FI01/00197 | 6/2001 |

* cited by examiner

Primary Examiner—Steven P. Griffin
Assistant Examiner—Anna L. Kinney
(74) Attorney, Agent, or Firm—Alston & Bird LLP

(57) ABSTRACT

The invention relates to a process for treating bleaching liquors from pulping processes based on organic acids. The process is characterized in that inorganic acid, such as nitric acid, phosphoric acid and/or sulphuric acid, is added into a bleaching liquor obtained from the bleaching or a stage closely associated with bleaching, whereby organic acids contained in the bleaching liquor are released into the bleaching liquor. The organic acids are then separated from the bleaching liquor and recycled to the cooking stage to be used as cooking chemicals. The nitrogen-, phosphor- and/or sulphur-containing product thereby produced, from which organic acids have been separated, is recovered to be used as a fertilizer or as raw material for a fertilizer.

20 Claims, No Drawings

PROCESS FOR RECOVERING ORGANIC ACIDS FROM BLEACHING LIQUORS

BACKGROUND OF THE INVENTION

The invention relates to pulping processes based on organic acids and particularly to the recovery of organic acids from bleaching liquors, such as alkaline filtrates and washing filtrates, obtained from bleaching or from stages closely associated with bleaching. At the same time, the process of the invention produces a valuable fertilizer by-product. The invention further relates to recycling of bleaching liquors. The invention is applicable in pulping processes based on organic acids, especially formic acid and/or acetic acid, wherein herbaceous plants or trees are used as raw material. The invention is also applicable in pulping processes employing other solvents and reagents.

Organic acids are produced in all pulping processes, but their utilization remains unsolved. In conventional processes, organic acids are usually harmful and consume the alkali used in the processes. Organic acids are formed not only in cooking, evaporation and drying of lignin, but also in bleaching. In alkaline hydrogen peroxide and/or oxygen/hydrogen peroxide bleaching, formic acid, acetic acid, oxalic acid and glycolic acid are typically produced. These acids react in the bleaching with alkalis to corresponding alkali metal salts. They add to the load of organic matter (COD) in waste waters and to the use of chemicals in water purification plants. The same problem appears in closed bleaching, because the salts do not evaporate, but remain in the concentrate. The treatment of the concentrate therefore continues to be an environmental and waste water issue.

FI patent publications 103 588 (WO 96/35013) and 103 899 (WO 98/20198) disclose processes based on formic acid which make use of the acids formed in cooking, evaporation and drying of lignin, the organic acids thereby formed being advantageous in view of process economy because they save cooking chemicals. Organic acids are formed as a result of hydrolysis reactions of hemicellulose and lignin and from acetyl groups of plants. In highly acid concentrations, esters are also produced. Esters may be converted back to organic acids, as described in FI patent application 973474 (WO 99/10595). However, these processes do not take advantage of the organic acids formed in the bleaching; on the contrary, the acids are lost in the alkaline bleaching, because they react immediately with the sodium hydroxide used in the bleaching, whereby salts are formed. Such salts are undesirable also in conventional processes because they get into waste waters.

BRIEF DESCRIPTION OF THE INVENTION

It is therefore an object of the present invention to provide an improved process based on organic acids for preparing pulp from herbaceous plants and trees in a manner which allows also the organic acids included in the bleaching liquors to be utilized. This allows any environmental and waste water problems involved in organic acids to be avoided and all the chemicals used in the process to be either returned to the process or utilized as commercial products. The process operates with a completely closed chemical and water cycle.

DETAILED DESCRIPTION OF THE INVENTION

The invention relates to a process for treating bleaching liquors in pulping processes based on an organic acid/organic acids. The process comprises cooking and bleaching of pulp in a manner known per se. The cooking is carried out using an organic acid, typically formic acid or acetic acid, a combination thereof, or a mixture comprising both acids or one of them. The bleaching is carried out using chlorine-free bleaching processes known per se. The raw material of the pulp comprises herbaceous plants or trees.

The invention is based on the idea of (a) adding inorganic acid, such as nitric acid, phosphoric acid and/or sulphuric acid, to bleaching liquor obtained from bleaching or a stage closely associated with bleaching, in order to release organic acids contained in the bleaching liquor into the bleaching liquor;

(b) separating the organic acids from the bleaching liquor and recycling the same to cooking to be used as cooking chemicals; and (c) recovering the nitrogen-, phosphor- and/or sulphur-containing product thus obtained, from which organic acids have been separated, to be used as a fertilizer or as raw material for a fertilizer.

In this context, the expression "bleaching liquor obtained from bleaching or a stage closely associated with bleaching" refers to a liquor obtained from the actual bleaching stages, pre-bleaching stages or pulp screening, or from any washing stages associated with these, after the pulp itself has been separated. The term "bleaching filtrate" means any bleaching liquor obtained from a stage associated with the actual bleaching, for example a bleaching liquor obtained in connection with alkaline hydrogen peroxide bleaching from the alkaline extraction stage or peroxide stage after the separation of pulp.

Before stage (a), the bleaching liquor may be concentrated, typically by first filtering and then evaporating it to a dry matter content of 10 to 75%, for example. The evaporated water is used as process water. The bleaching liquor may, however, also be used in a non-concentrated form.

The silicon compounds in herbaceous plants may be precipitated before stage (a) by adjusting the pH of the bleaching liquor to a range of 7 to 9. This may be carried out using the same inorganic acid as in stage (a), i.e. nitric acid, phosphoric acid and/or sulphuric acid. The precipitated silicon compounds are separated and the bleaching liquor obtained is concentrated, typically by evaporating it to a dry matter content of 10 to 75%. The evaporated water is used as process water. The separation of the silicon compounds before the evaporation improves the evaporation conditions. At the same time, the content of formiate and acetate salts in the concentrate increases, which allows as high acid concentrations in stage (a) as possible to be ensured. However, a non-concentrated bleaching liquor may also be used.

The inorganic acid used in stage (a) of the process of the invention is selected on the basis of the desired nutrient content of the fertilizer by-product to be obtained. If a nitrogen-containing fertilizer is to be obtained, nitric acid is used, if a phosphor-containing fertilizer is to be obtained, phosphoric acid is used, and if a sulphur-containing fertilizer is to be obtained, sulphuric acid is used.

The pH range of the filtrate leaving the alkaline bleaching stage is typically 7 to 11.5 (when the bleaching is carried out for example as an alkaline hydrogen peroxide bleaching where potassium hydroxide is used as the alkali). In stage (a) of the process of the invention, inorganic acid is added to the bleaching liquor to reduce its pH to a level where organic acids are released for example from their esters or salts to the bleaching liquor.

In an industrial implementation of the process, the inorganic acid added in stage (a) is as concentrated as possible to minimize the amount of water supplied together with the acid. The concentration of the acid may be for example 60 to 95%, although less concentrated acids can also be used in the present invention. The amount of the inorganic acid to be added is such that the pH range of the bleaching liquor is typically 0 to 6, preferably 0 to 3.

To obtain a nitrogen-containing fertilizer, nitric acid alone is used for adjusting the pH of the bleaching liquor to the range of 0 to 6, preferably 0 to 3.

A fertilizer containing nitrogen and phosphor can be obtained for example by adding first phosphoric acid to provide a neutral pH, i.e. of about 7 to 8. Then, nitric acid is added to provide the pH of about 0 to 6, preferably 0 to 3.

When an inorganic acid is used to acidify the bleaching liquor in stage (a) of the process of the invention, the formiates and acetates contained in the bleaching liquor are released and corresponding organic acids, i.e. formic acid and acetic acid, are formed. The formiates and acetates formed from the washing losses of pulp react similarly, organic acids (formic acid and acetic acid) being thereby formed into the solution. In other words, organic acids are released using inorganic acids which are stronger than the organic ones, inorganic salts being formed at the same time. As mentioned above, the acids in question are particularly acids producing salts that can be used as fertilizers.

The organic acids released into the bleaching liquor are separated from it, typically by means of evaporation or extraction and/or drying, which allows the inorganic salts to separate at the same time by crystallizing. The evaporation may be carried out using a thin film evaporator/drier, for example. The organic acids are then usually concentrated by distillation to provide the desired acid concentration after which they are recycled to cooking to be used as a cooking acid and/or sold as a commercial product.

It has been observed that the amounts of organic acids thus recovered are significant with regard to the total amount of chemicals needed. The total amount of formic acid, acetic acid and oxalic acid that can be separated from the bleaching liquor may be as much as 6 to 8% (60–80 kg per 1000 kg) of dry pulp. The total amount of make-up cooking chemicals is typically 5 to 10% (50–100 kg per 1000 kg) of pulp.

The nitrogen-, phosphor- and/or sulphur-containing product obtained from stage (b), from which organic acids have been separated, is recovered in stage (c) to be used as a fertilizer or as raw material for a fertilizer. The product obtained from stage (c) is usually also concentrated. The concentration is typically carried out by evaporation, drying and/or crystallization to a dry matter content of 80 to 100%, for example.

The final fertilizer is typically produced for example by granulating the nitrogen-, phosphor- and/or sulphur-containing product thus obtained to convert it into a solid form suitable to be used as a fertilizer.

The nutrient value of the fertilizer may be further increased if the bleaching that produces the bleaching liquor in stage (a) is carried out by using a bleaching sequence comprising alkaline stages and, particularly, by using potassium hydroxide as the alkali, as it will produce potassium, which is most important for plants, into the bleaching liquor.

The bleaching liquor, typically a bleaching filtrate, used as the starting material in stage (a) originates therefore preferably from a bleaching sequence containing alkaline stages. The bleaching is typically an alkaline hydrogen peroxide bleaching. The bleaching sequence may also comprise an oxygen phase, ozone phase or peracetic phase.

The alkali used in bleaching sequences comprising alkaline stages is preferably potassium hydroxide, either alone or together with sodium hydroxide and/or ammonium hydroxide. Potassium hydroxide can also be used for increasing pH before the bleaching. In addition to potassium hydroxide, other potassium compounds may also be used. This allows a potassium-containing bleaching liquor rich in potassium nutrients needed by plants to be obtained.

In addition to potassium, magnesium compounds may also be used in connection with bleaching since magnesium compounds also have nutrient value in fertilizer use. The most common way to use magnesium in pulp bleaching is to use magnesium sulphate as a stabilizer. Magnesium in the form of $Mg(OH)_2$ can also be used before the bleaching to increase the pH of acidic pulp. At the same time, it serves as a stabilizer in oxygen-based bleaching stages, for example in hydrogen peroxide and peracetic bleaching.

However, bleaching comprising alkaline stages can also be used together with ozone or per(carboxylic)acid bleaching, the fertilizer produced as a by-product naturally being then free of potassium.

As a result of bleaching in which potassium hydroxide is used and in which phosphoric acid serves as the inorganic acid in stage (a), formic acid, acetic acid and potassium phosphate are produced. Formic acid is returned to cooking and acetic acid is either returned to cooking and/or offered for sale. Potassium phosphate is recovered to be used in compound fertilizers, for example (potassium phosphate being an important part of compound fertilizers).

Correspondingly, when the bleaching is carried out using potassium hydroxide and nitric acid is used as the inorganic acid in stage (a), formic acid, acetic acid and potassium nitrate are produced. The last one is an important nitrogen-potassium fertilizer. Potassium hydroxide, phosphoric acid and nitric acid used together allow an NPK fertilizer to be prepared.

The inorganic acid used in stage (a) may also be sulphuric acid which together with potassium hydroxide produces potassium sulphate used in chlorine-free fertilizers. Chlorine-free fertilizers are useful for example in the preparation of high-quality garden fertilizer products.

The composition of the fertilizer can be further adjusted by adding ash obtained from a bio power plant of a pulp mill to the potassium-, nitrogen-, phosphor- and/or sulphur-containing bleaching concentrate thus produced. The lignin fraction recovered from the cooking and washing stage and, together with it, possibly other organic matter produced as a by-product of the pulp production are burned in the power plant. Said ash fraction contains nutrients (K, Ca, P, Mg, Fe and other acid-soluble components) which have been separated during the cooking into the cooking liquor and further into the lignin-hemicellulose fraction during the recovery of formic acid used as the cooking chemical. The ashes may also contain an ash component obtained from the burning of cellulose raw material, such as straw screenings.

In hydrogen peroxide bleaching, the hemicellulose contained in the pulp reacts from 1 to 5 percentage units, depending on the bleaching requirements. Pulp typically contains about 15% of hemicellulose, the proportion of unreacted hemicellulose left in the pulp after the bleaching amounting up to 10–14%. The hemicellulose obtained from plants and hardwoods mainly consists of xylans that react to xylose, after which they are hydrolyzed to form organic acids. Similarly, some of the lignin separated in the bleaching forms organic acids. The process of the invention allows such organic acids to be recovered.

Moreover, the process of the invention allows to utilize any free acids and formiate and acetate esters possibly left as washing loss in the unbleached pulp, because they react with the alkaline bleaching chemical to corresponding salts. Also these salts react in the acid treatment to organic acids, the process of the invention thus allowing them to be reused, which significantly reduces the losses in the washing of unbleached pulp, the losses being 0.5 to 5% of pulp, depending on the process applied.

The concentrate produced by the evaporation of the bleaching liquors also contains other organic compounds, such as lignin and hemicellulose. These compounds are included in the bleaching concentrate obtained in accordance with the invention, the invention thus allowing the compounds to be utilized as additional components in the fertilizer.

The above process operations allow a fully closed water cycle to be implemented in a pulp mill. The organic acids formed in the pulping process can be utilized as cooking chemicals, and the hemicellulose dissolved in the bleaching can be completely hydrolyzed into organic acids which in turn can be utilized in the cooking. The evaporated water is reused as process water. The acids formed in the process can be used to compensate for the chemical losses occurring in the process. In an optimum situation, the overall consumption of cooking chemicals in the process may be compensated for by using acids formed in the process, and all inorganic chemicals may be utilized as a fertilizer. The consumption of cooking chemicals in pulping processes based on organic acids is typically 5 to 10% (50–100 kg per 1000 kg) of pulp.

The process of the invention allows a total amount of organic acids of 6 to 8% (60 to 80 kg per 1000 kg) of dry pulp to be obtained. Correspondingly, salts suitable for use as fertilizers are produced in an amount of 12 to 16% (120 to 160 kg), of which potassium, nitrogen and phosphor (K, N, P) account for 50% (the bleaching being carried out using potassium hydroxide and the inorganic acids used in stage (a) being nitric acid and phosphoric acid).

The process of the invention is particularly suitable for pulping processes based on formic acid and/or acetic acid and using herbaceous plants and corresponding non-wood fibre sources as raw material. The most important fibre sources are straw, typically corn straw (wheat, rye, oats, barley, rice), grasses, e.g. giant reed, esparto grass, sabai grass and lemon grass, reeds, such as papyrus, common reed, sugar cane, or bagasse, and bamboo, bast fibres, e.g. stems of fibre flax or seed flax, kenaf, jute and hemp, leaf fibres, e.g. manilla hemp and sisal, and seed hairs, such as cotton and cotton linter fibres.

Useful grasses that grow in Finland are e.g. common reed, reed canary grass, tall fescue and timothy.

The process of the invention can also be applied to wood material.

The invention applies not only to processes based on organic acids, such as formic acid, but also to pulping processes using other solvents and reagents.

A closed bleaching cycle is particularly well suitable for the process of the invention and for other processes employing acidic delignification and pulp washing stages. For example, calcium (Ca) is dissolved and washed from the pulp and not taken to bleaching, where oxalic acid is formed in all bleaching sequences. If calcium is present in the bleaching, as for example in kraft and soda processes and other similar processes, calcium oxalate is formed, which is known to be poorly soluble and which may precipitate even quite firmly to filtrate containers, wires and on the surfaces of evaporators. In the process of the invention the calcium contained in the raw material is separated in the cooking and pulp washing, wherefore it cannot form calcium oxalate in the bleaching liquors. The calcium ends up in the ash produced from the burning of the lignin.

The process of the invention can be applied in sulphate processes and other similar processes, provided that the impact of calcium has been eliminated by an acidic washing stage having pH of 3 or lower. Organic acids can then be utilized in a sulphate process to adjust the pH in the recovery of tall oil, for example, which allows excessive amounts of sulphur (extra sulphur load) in the process to be avoided by replacing sulphuric acid with organic acids.

The following examples illustrate the invention:

EXAMPLE 1

Cellulose derived from wheat straw and produced in a formic-acid-based process was used (the amounts of bound acids washed in unbleached pulp being: formic acid 0.9% and acetic acid 2.4%). The unbleached pulp was bleached in an alkaline hydrogen peroxide bleaching using KOH to adjust the pH. The amount of hydrogen peroxide used was 3.0% and that of KOH 11.9% of the dry pulp. From the alkaline peroxide bleaching filtrate of the pulp (having initial consistency of 12%, final pH 10.9) a batch of 71.4 g was taken and neutralized with 0.5 M nitric acid to a pH of 2. The amount of nitric acid consumed was 52.4 ml, or 0.03 mol, the nitric acid consumption (calculated as 100% nitric acid) per 1000 kg of bleaching filtrate being 23.1 kg (367 mol).

The fertilizer amounts per 1000 kg of bleaching filtrate were: potassium (K) 10.0 kg and nitrogen (N) 4.1 kg. The fertilizer amounts per 1000 kg of dry pulp were K=84 kg and N=35 kg.

The acid contents (the amounts of organic acids delivered to the acid recovery stage) per 1000 litres of bleaching filtrate and 1000 kg of dry pulp were as follows:

| Acid | kg/1000 l of filtrate | kg/1000 kg of pulp |
|---|---|---|
| Oxalic acid | 1.3 | 13.3 |
| Glycolic acid | 2.3 | 20.4 |
| Formic acid | 2.4 | 21.4 |
| Acetic acid | 4.0 | 35.4 |

EXAMPLE 2

Cellulose derived from Miscanthus sinensis and produced in a formic-acid-based process was used (the amounts of bound acids washed in unbleached pulp being: formic acid 1.2% and acetic acid 2.4%). The unbleached pulp was bleached in an alkaline hydrogen peroxide bleaching using KOH to adjust the pH. The amount of KOH used in the alkaline extraction stage was 8.4% and that of hydrogen peroxide 0.75% of the amount of dry pulp. After the alkaline extraction stage (having an initial consistency of 12%), two hydrogen peroxide stages (having a consistency of 10%) were carried out, the amount of hydrogen peroxide used in the first stage being 2.5% and in the second stage 2.0% of the dry pulp amount. From the bleaching filtrate (having a final pH of 11.1) obtained from the alkaline extraction stage of the pulp bleaching, a batch of 100 g was taken and neutralized with 0.8 M phosphoric acid to pH 7 and with 0.5 M nitric acid from pH 7 to pH 2. The amount of phosphoric acid ($H_3PO_4$) consumed was 9.2 ml (0.007 mol) and that of nitric acid 52.0 ml (0.03 mol), the consumption of nitric acid and that of phosphoric acid (calculated as 100% acids) per 1000 kg of bleaching filtrate being 6.9 kg (71 mol) for the phosphoric acid and 12.3 kg (195 mol) for the nitric acid ($HNO_3$).

The fertilizer amounts per 1000 kg of bleaching filtrate were: potassium (K) 7.0 kg, phosphor (P) 2.3 kg and nitrogen (N) 2.8 kg. The amounts of fertilizer per 1000 kg of dry pulp were K=62 kg, P=20 kg and N=25 kg.

The following table shows the amounts of organic acids recovered from the different bleaching stages, i.e. from the alkaline extraction and the first and second peroxide stages, per 1000 litres of bleaching filtrate:

|  | Alkaline extraction (kg/1000 l) | Peroxide 1 (kg/1000 l) | Peroxide 2 (kg/1000 l) | Total (kg/1000 l) |
| --- | --- | --- | --- | --- |
| Oxalic acid | 0.5 | 0.8 | 0.2 | 1.5 |
| Glycolic acid | 0.6 | 1.7 | 1.0 | 3.3 |
| Formic acid | 1.9 | 0.7 | 0.4 | 3.0 |
| Acetic acid | 3.4 | 0.8 | 0.3 | 4.5 |
| Total | 6.4 | 4.0 | 1.9 | 12.3 |

The following table shows the amounts of organic acids recovered from the different bleaching stages, i.e. from the alkaline extraction and the first and second peroxide stages, per 1000 kg of dry bleached pulp:

|  | Alkaline extraction (kg/1000 kg) | Peroxide 1 (kg/1000 kg) | Peroxide 2 (kg/1000 kg) | Total (kg/1000 kg) |
| --- | --- | --- | --- | --- |
| Oxalic acid | 6.0 | 8.1 | 2.1 | 16.2 |
| Glycolic acid | 7.2 | 17.2 | 10.4 | 34.8 |
| Formic acid | 22.7 | 7.1 | 4.2 | 34.0 |
| Acetic acid | 40.5 | 8.1 | 3.1 | 51.7 |
| Total | 76.4 | 40.5 | 19.8 | 136.7 |

It is apparent to a person skilled in the art that as technology advances, the basic idea of the invention can be implemented in various ways. The invention and its embodiments are therefore not restricted to the above described examples but they may vary within the scope of the claims.

What is claimed is:

1. A process for treating bleaching liquors from pulping processes based on organic acids, the process comprising cooking with organic acids and bleaching of pulp, and further comprising
    (a) adding inorganic acid selected from nitric acid, phosphoric acid and/or sulphuric acid to bleaching liquor obtained as a result of bleaching or a stage closely associated with bleaching;
    (b) separating the organic acids from the bleaching liquor and recycling the same to cooking to be used as cooking chemicals; and
    (c) recovering the nitrogen-, phosphor- and/or sulphur-containing product thus obtained, from which organic acids have been separated, to be used as a fertilizer or as raw material for a fertilizer.

2. A process according to claim 1, wherein the pulp is bleached using alkaline bleaching in which at least some of the alkali is potassium hydroxide.

3. A process according to claim 2, wherein also magnesium hydroxide and, optionally, ammonium hydroxide are used as the alkali.

4. A process according to claim 1, wherein the bleaching liquor to which the inorganic acid is added in stage (a) is a bleaching filtrate.

5. A process according to claim 1, wherein the amount of inorganic acid to be added in stage (a) is such that it allows a bleaching liquor pH within a range of 0 to 6 to be obtained.

6. A process according to claim 5, wherein a bleaching liquor pH within a range of 0 to 3 is obtained.

7. A process according to claim 1, wherein nitric acid is added in stage (a) to adjust the pH of the bleaching liquor to a range of 0 to 6.

8. A process as claimed in claim 7, wherein pH is adjusted to a range of 0 to 3.

9. A process according to claim 1, wherein phosphoric acid is added in stage (a) to adjust the pH of the bleaching liquor to a range of 7 to 8 after which nitric acid is added to adjust the pH of the bleaching liquor to the range of 0 to 6.

10. A process according to claim 9, wherein nitric acid is added to adjust the pH of the bleaching liquor to a range of 0 to 3.

11. A process according to claim 1, wherein in stage (b) organic acids are separated by evaporation or extraction.

12. A process according to claim 1, wherein the nitrogen-, phosphor- and/or sulphur-containing product obtained from stage (c) is converted into a solid form to be used as a fertilizer.

13. A process according to claim 12, wherein the product is granulated.

14. A process according to claim 1, wherein the organic acid used in the pulp production comprises formic acid, acetic acid or a mixture thereof.

15. A process according to claim 1, wherein before stage (a) the bleaching liquor is concentrated by evaporation and the evaporated water is used as process water.

16. A process according to claim 15, wherein the bleaching liquor is concentrated to a dry matter content of 10 to 75%.

17. A process according to claim 1, wherein the inorganic acid added in stage (a) is added into a non-concentrated bleaching liquor.

18. A process according to claim 1, wherein the raw material used for the pulp comprises herbaceous plants.

19. A process according to claim 18, wherein stage (a) is preceded by a stage in which the pH of the bleaching liquor is adjusted to a range of 7 to 9 to precipitate silicon compounds in one or more stages, the precipitated silicon compounds being separated and the bleaching liquor thus obtained concentrated.

20. A process according to claim 19, wherein the bleaching liquor is concentrated by means of evaporation to a dry matter content of 10 to 75%.

* * * * *